Figure 1:
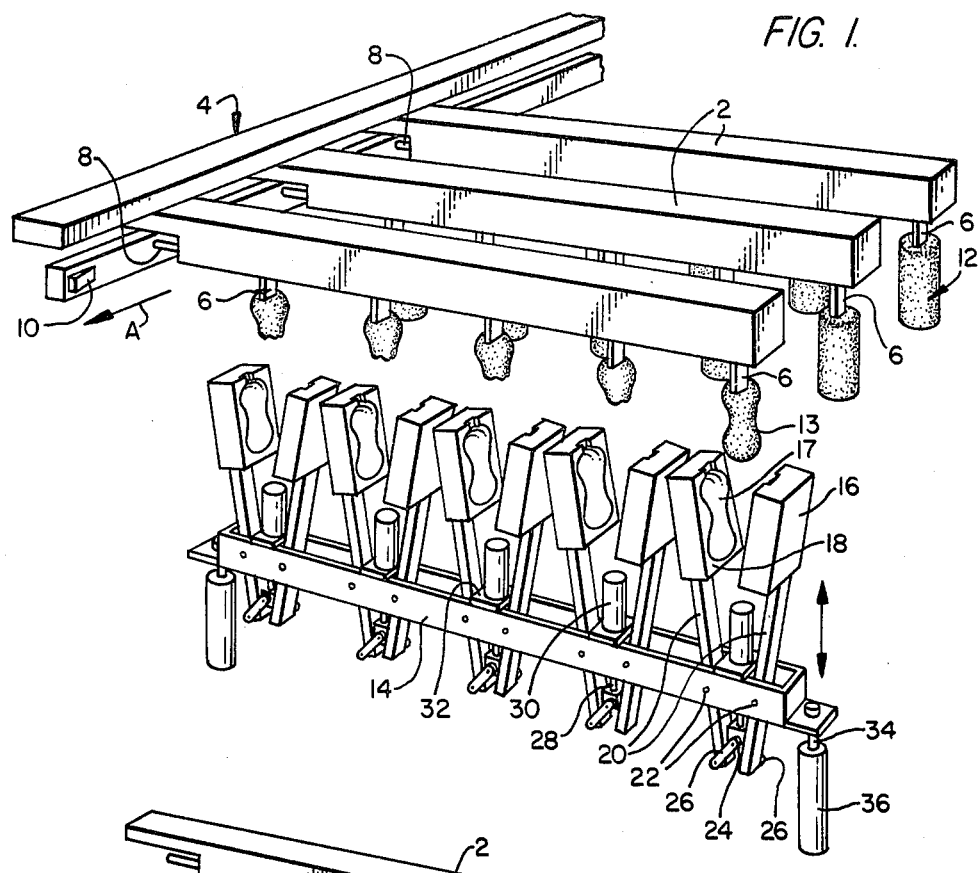

United States Patent [19]

Waldström

[11] 4,413,461
[45] Nov. 8, 1983

[54] APPARATUS FOR SHAPING FROZEN CONFECTIONS

[75] Inventor: Ejvind Waldström, Hundslund, Denmark

[73] Assignee: O. G. Hoyer A/S, Hojbjerg, Denmark

[21] Appl. No.: 284,790

[22] Filed: Jul. 20, 1981

[51] Int. Cl.³ .................. B65B 5/04; B65B 63/00
[52] U.S. Cl. ..................................... 53/122; 53/559; 53/594; 425/90; 425/126 S; 425/310; 425/384; 425/437
[58] Field of Search .............. 425/90, 126 S, 126 R, 425/225, 226, 437, 310, 384; 426/515; 53/128, 134, 122, 222, 546–548, 553, 581, 594, 559

[56] References Cited

U.S. PATENT DOCUMENTS

| 1,094,614 | 4/1914 | Ward | 53/222 |
|---|---|---|---|
| 1,960,456 | 5/1934 | Robb | 53/581 |
| 2,494,484 | 1/1950 | Nicolle | 53/553 |
| 2,535,231 | 12/1950 | Rasmussen | 426/515 |
| 2,613,488 | 10/1952 | Attride | 53/122 |
| 2,705,857 | 4/1955 | Fox et al. | 425/126 S |
| 2,877,121 | 3/1959 | Anderson et al. | 53/594 |
| 3,043,070 | 7/1962 | Cammack | 53/594 |
| 3,214,885 | 11/1965 | Gram | 53/594 |
| 3,809,774 | 5/1974 | Raitt | 426/515 |
| 4,242,292 | 12/1980 | Mercer et al. | 264/138 |
| 4,268,469 | 5/1981 | Bouwknegt et al. | 264/138 |

FOREIGN PATENT DOCUMENTS

| 245195 | 1/1963 | Australia | 425/126 S |
|---|---|---|---|
| 724549 | 2/1955 | United Kingdom | 425/126 S |

*Primary Examiner*—Willard E. Hoag
*Attorney, Agent, or Firm*—Antonelli, Terry & Wands

[57] ABSTRACT

Ice cream lollies of complex shapes are produced by a die pressing operation, whereby a prefrozen and deformable lolly body is placed between a pair of die tools. The bodies to be die shaped may be either conventionally produced bodies as prefrozen about a stick, in which the body is held during the shaping operation, or they may be lumps of extruded prefrozen material, whereby a preparatory conventional mold freezing can be avoided. The die tools may be used additionally for concurrently providing and sealing an envelope about the final product, thus finishing it as a sales product.

14 Claims, 14 Drawing Figures

APPARATUS FOR SHAPING FROZEN CONFECTIONS

The present invention relates to the production of ice cream lollies and similar products having such an irregular shape that they are unable to be produced by conventional mold freezing and demolding by simple retraction from a mold, this technique requiring the products to be shaped with a certain slip in the molds or at least without "negative slip".

A known manner of producing such irregular lollies is to freeze the ice cream in molds of thin rubber sheet and retract the frozed lolly during inversion of the mold, but this method is disadvantageous in several respects.

It is the purpose of this invention to provide for novel and improved methods and means for producing the said products in a simple and efficient manner.

According to the invention the irregularly shaped lollies are produced from prefrozen lolly bodies of regular shape, provided in any suitable and easy manner, these bodies being subjected to a die pressing treatment whereby the material of the lolly bodies is forced to be deformed according to the irregularly shaped cavity of the closed dies, the die parts thereafter being reopened to release the finished product. In a highly advantageous manner the die tools may be used even for providing and sealing an envelope about the finished ice cream lolly, thus finishing it as a sales product.

Figure 2:
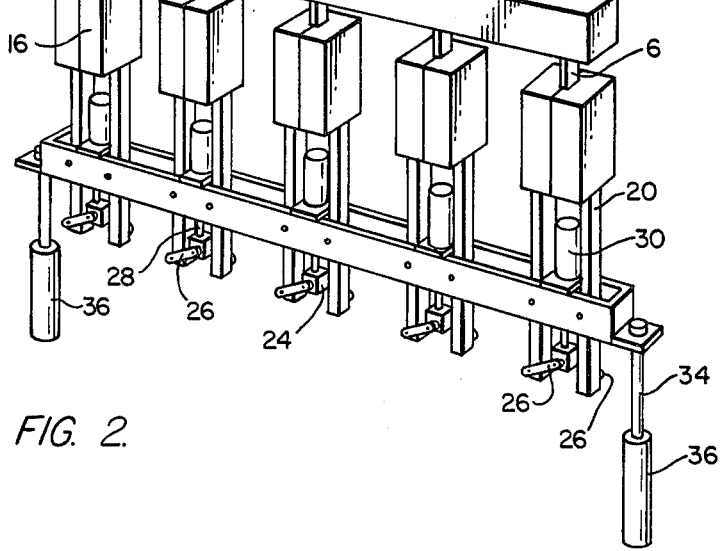
Figure 3:
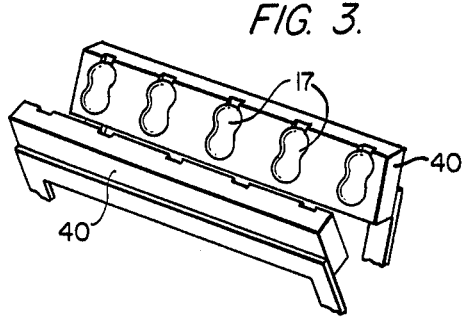
Figure 5:
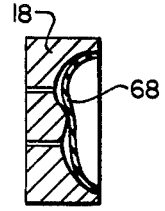
Figure 7:
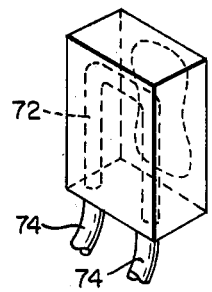
Figure 4:
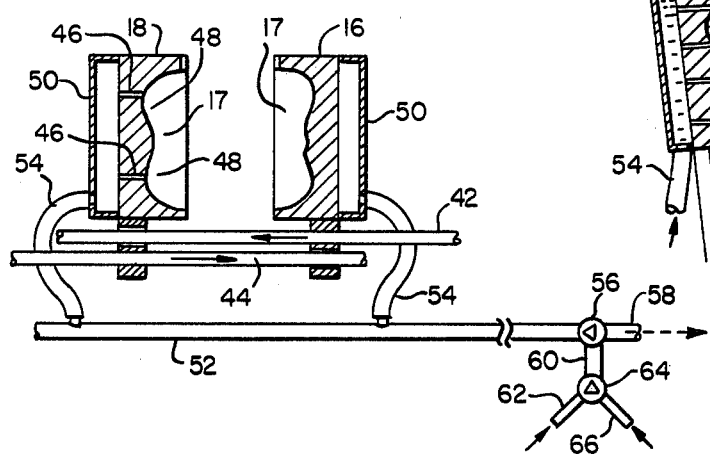
Figure 6:
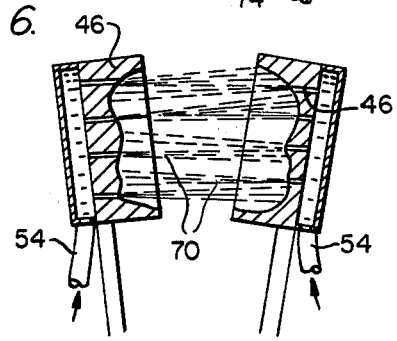
Figure 8:
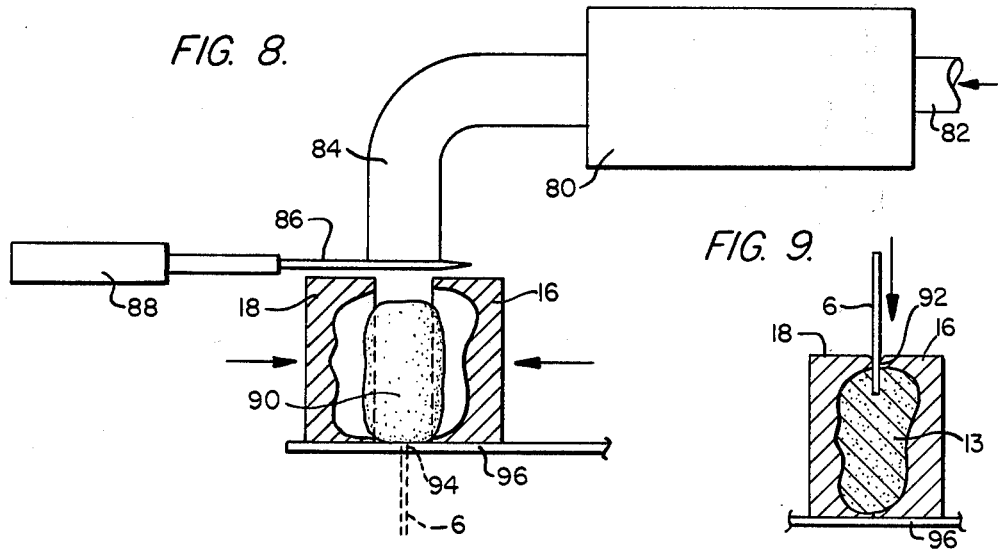
Figure 9:
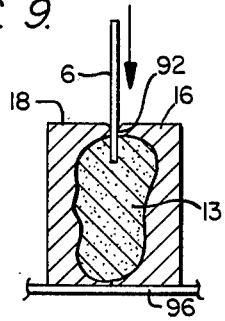
Figure 10:
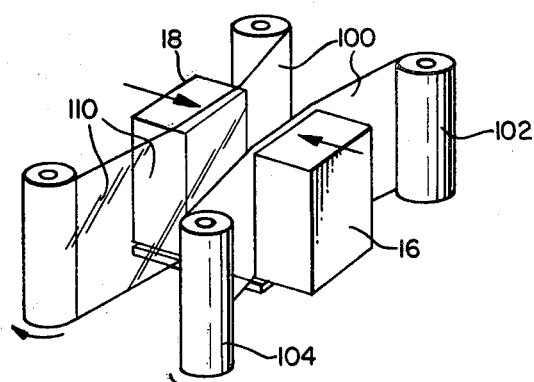
Figure 11:
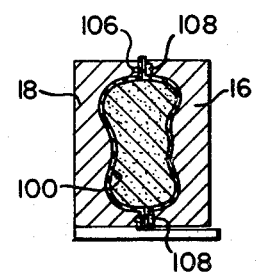
Figure 12:
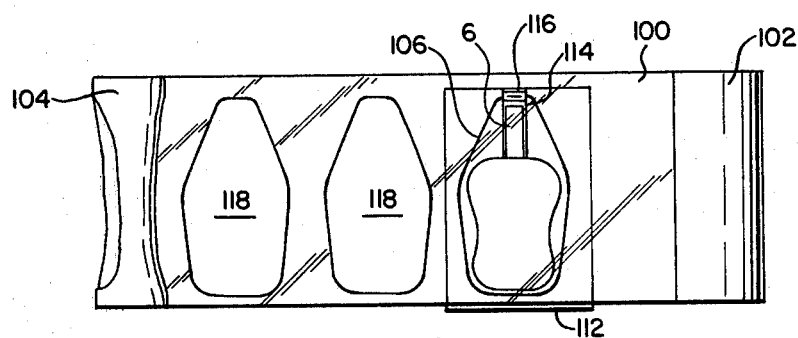
Figure 13:
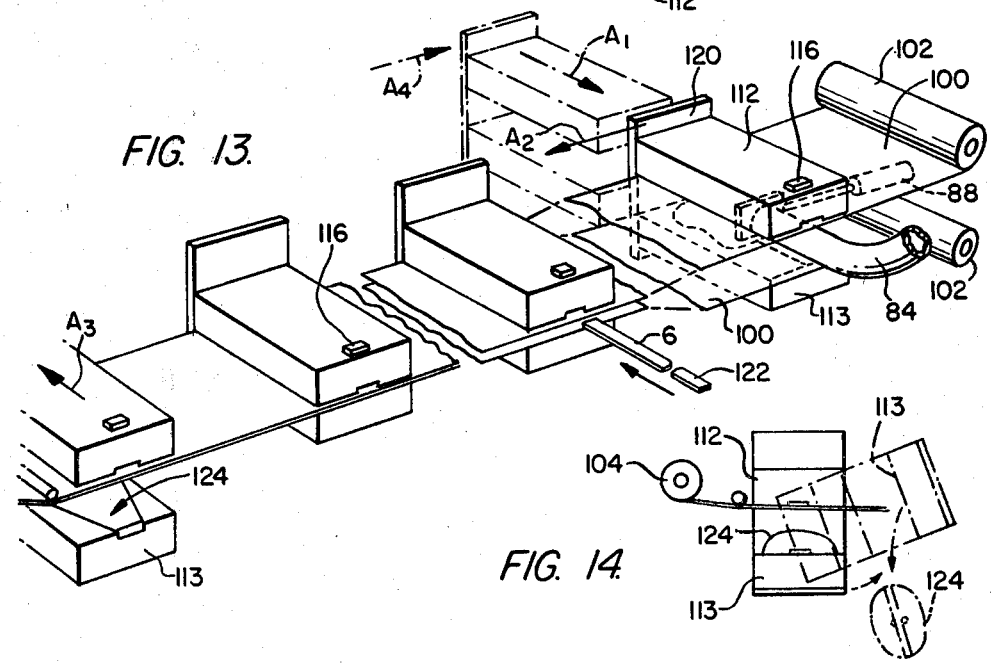

The invention, which is defined in the appended claims, will now be described in more detail with reference to the accompanying drawings, in which FIG. 1 is a schematic perspective view of a section of a machine for producing ice cream lollies, shown with a set of die tools in open positions, FIG. 2 is a corresponding view of the tool set in closed condition, FIG. 3 is a perspective view of a modified tool set, FIGS. 4–6 are sectional views illustrating further modifications of the tools, FIG. 7 is a perspective view of a modified tool part, FIG. 8 is a side elevation, partly in section, of a second type of machine according to the invention, FIG. 9 is a sectional view of a modified tool set in this machine, FIG. 10 is a schematic perspective view illustrating a further modification, FIG. 11 is a sectional view thereof, FIG. 12 is a plan view illustrating a packaging system, and FIG. 13 is a schematic perspective view of a combined die shaping and packaging machine according to the invention.

The upper part of FIG. 1 is very schematically illustrative of a section of a conventional ice cream lolly freezing/molding machine which comprises a number of carrier beams 2 arranged in a spaced parallel manner and being supported by a rail system 4, along which they are intermittently movable, in the direction of the arrow A, by means of any suitable driving arrangement (not shown). At their undersides the beams 2 are provided with clamp means for releasably holding a series of lolly sticks 6 in a position depending from the respective beams 2, and each beam is provided with an actuator member 8 operable to release the clamp means, e.g. by passing a stationary actuator 10 on the rail system 4.

In a manner not shown the rail system 4 projects along a production line comprising a station for mounting the sticks 6 in the clamp means of the successive beams 2, and a station in which the beams are lowered so as to bring the lower ends of the sticks 6 down into respective freezing pockets of an underlying freezing machine, in which a plurality of freezing pocket batteries each corresponding to one beam 2 is arranged so as to be partly immersed into a bath of freezing brine and be movable along with the respective beams 2 with the sticks 6 in centered positions in the single freezing pockets. The freezing machine is provided with means for supplying to the single pockets a well defined amount of precooled, liquid ice cream or a similar relevant material, which is thereafter frozen in the pockets by means of said brine. The production line further comprises a station in which the freezing pockets are successively heated from their outsides to provide slippage between the frozen ice cream bodies and the insides of the pockets, and following station in which the beams 2 are caused to be raised relative to cooperating freezing pocket batteries, whereby the frozen bodies on the sticks 6 are retracted from the pockets so as to now constitute regular ice cream lollies as designated 12 in FIG. 1.

In conventional plants the lollies 12 are thereafter released from the beams 2 and collected for being packed; normally the lollies are packed in individual envelopes before they are packed in sales boxes.

According to the present invention the lolly bodies 12 are subjected to a die shaping operation before they are released from the beams 2, the relevant shaper means being shown in the lower part of FIG. 1, vertically aligned with the ice lollies of an overlying beam 2. The shaper means comprise a chassis beam 14 carrying a number of tool sets each consisting of two die parts 16 and 18 mounted topwise on respective levers 20, which are pivoted to the chassis beam 14 by means of horizontal pins 22. The lower end of the levers 20 are connected with an actuator head 24 through respective pivot links 26, said actuator head 24 constituting the lower end of a piston rod 28 of a vertical working cylinder 30 mounted rigidly on a carrier member 32 fixed to the chassis beam 14.

It will be readily understood that through the action of the lower pivot links 26 the top ends of the levers 20 will be swung away from each other when the cylinder 30 is actuated to raise the actuator head 24 (FIG. 1) and swung towards each other in response to the actuator head 24 being lowered (FIG. 2), whereby the die tool parts 16 and 18 are disengageable and engageable with each other, respectively.

The chassis beam 14 is supported by the piston rods 34 of a pair of opposed, vertical working cylinders 36 mounted in a stationary manner on a suitable fixed support (not shown), whereby the chassis beam 14 and the die tools thereof are displaceable between a lower, inactive position (FIG. 1) and a raised position (FIG. 2).

The die tool parts 16 and 18 are provided with interfacing mold cavities or rather semi-cavities 17 of such a combined shape and volume that one of the prefrozen lolly bodies 12, when placed between the spaced apart tool parts 16 and 18, will be deformed into the desired final shape of the product of ice cream or the like, when the tool parts are moved against each other. This, of course, will require a correct adaption of the shape and volume of the prefrozen bodies 12 relative the volume and shape of the combined laid together cavities 17, and moreover it will be necessary that the ice cream or the similar material, as prefrozen as bodies 12, is so adapted that it is materially or plastically deformable by the action of the tool parts 16 and 18 being forced together about the respective prefrozen body 12. The latter adaption is a question of adding to the liquid starting material of the bodies 12 a suitable softening or plastizising agent such as glycerol in case of conventional ice cream, but generally this adaption of the material is not forming part of the present invention.

The said shaper means, as constituted by the chassis beam 14 with its associated pairs of die tool parts 16,18, are located underneath a stop position of the intermittently advanced carrier beams 2, and it will be readily understood that the chassis beam 14 with the tool parts in open positions (FIG. 1) will be raisable into a position, in which the prefrozen lollies 12 of the overlying beam 2 are located in the free space between the respective tool parts 16 and 18, such that thereafter the lollies will be engaged by the walls of the mold cavities 17, when the tool parts 16 and 18 are forced together by actuation of the cylinders 30 (FIG. 2).

When hereby the lollies have been given their desired final shape the tool parts 16 and 18 are caused to be swung away from each other by means of the cylinders 30, and the chassis beam 14 is lowered by means of the cylinders 36 to the position shown in FIG. 1. Then the beams 2 are advanced a step to bring a new set of lollies 12 into register with the die tools. The already die shaped lollies, designated 13 in FIG. 1, may be released from their beam 2 by means of the actuator 10, or they may remain clamped to the carrier beam and be passed through a wrapping station for receiving individual envelopes prior to or simultaneously with their being released from the beam.

In FIGS. 1 and 2 is shown that the prefrozen lollies 12 are of a cross sectional shape which is oblong in the moving direction of the beams 2 (arrow A), and that each pair of tool parts 16 and 18 operates crosswise to this direction, the tool parts being arranged series-like along the beam 2. It will be appreciated, however, that the cross sectional shape of the lollies 12 need not be oblong in the direction of the arrow A, as it may be circular or even oblong in the beam direction, and that the various pair of tool parts 16,18 may be arranged on the chassis beam 14 so as to clamp about the lollies by movements in opposite directions parallel with the moving direction A of the beams 2. In the latter case it is of course essential that the chassis beam 14 for each new operation is lowered so as to enable the new lollies 12 to pass above the top end of the upstream die tool part, while the die shaped lollies should correspondingly be able to be moved away in a level above the downstream tool part. With this arrangement, of course, the minimum spacing between the neighboring tool sets along the chassis beam will be given by the width of the single die tool parts 16 and 18, because extra space, generally between the tool sets, need not be provided for in order to allow the tool parts to assume their open positions; of course the spacing between the consecutive carrier beams 2 should then be sufficient to avoid interference between the opened tool parts and the lollies of the neighboring beams 2. When in this case the tool part sets are arranged in parallel with each other along the chassis beam 14 the respective opposed tool parts, as shown in FIG. 3, may be interconnected such that the entire tool set is constituted by two opposed, broad tool parts 40 each having the required number of forming cavities 17. These tool parts may be supported and actuated in a manner analogous to each of the tool sets of FIGS. 1 and 2.

FIG. 4 illustrates an alternative moving control system for the die tool parts 16 and 18, in which the tool parts are guided in parallel relationship and connected to respective horizontal rods 42 and 44 so as to be displaceable towards and away from each other when these rods are caused, in any suitable manner, to be displaced in respective opposite directions; thus, the tool parts will be closed when the rods 42 and 44 are displaced as shown by arrows.

In connection with the die shaping of the ice cream lollies 12 in the forming cavities 17 it may be a problem that air can be trapped in these cavities adjacent the wall portions thereof forming inner pockets of the cavities. In the left hand side of FIG. 4 it is illustrated that this problem may be overcome by providing the tool part with a narrow channel connection 46 between the bottoms of said pockets, designated 48, and the rear surface of the tool part, whereby the trapped air may escape through these channels. In the right hand side of FIG. 4 it is illustrated that the tool part 16 consist of a microporous material, whereby the same problem will be solved by virtue of the ability of the material to let the trapped air escape through the tool part material itself.

As also shown in FIG. 4 the rear side of the tool parts may be covered by a hood member 50 connected to a pipe 52 through a flexible hose 54. Through a switch over valve 56 the pipe 52 is connectable with either an exhaust outlet 58 or an inlet 60, through which compressed air is introduceable into the pipe 52 from an air pipe 62. The admission of compressed air into the pipe 52 serves the purpose of facilitating slippage between the shaping cavities 17 and the die shaped articles 13 (FIG. 1) when the tool parts 16 and 18 are moved away from each other, since the compressed air, when applied to the pipe 52 by the initial opening of the tool parts, will enter into the rear portions of the shaping cavities 17 either through the channels 46 or generally, through the said microporous tool part material and thereby serve to promote the slippage between the shaped article 13 and the wall portions of the shaping cavities 17.

As shown in FIG. 4 the inlet pipe 60 to the switch over valve 56 may be connected with another switch over valve 64 having the compressed air pipe 62 as one inlet and a pipe 66 as another inlet. The latter is connected to a source of cleansing liquid, whereby at the end of a working day or at other prescribed or desired intervals of time the valve 64 may be actuated to feed a pressurized cleansing liquid to the pipe 52 through the valve 56, such that hereby the cleansing liquid will rise through the hoses 54 and be forced through the channels 46 or through the microporous tool part material so as to merge on the surface of the shaping cavities 17, whereby an effective cleaning of the system is achievable.

In FIG. 5 it is illustrated that each tool part 18 (or 16) may be provided with a resilient diaphragm 68 which is sealingly connected with the outer edge portion of the shaping cavity 17 and is able to get deformed into conformity with the bottom configuration of the shaping cavity 17. Hereby it will be excluded that the channels 46 can be contaminated by aged deposits of ice cream, and moreover the diaphragm 68 will further reduce any slippage problems.

FIG. 6 shows a pair of tool parts 16,18 in opened condition as in FIG. 1, i.e. located inclined in front of each other. The channels 46 are directed such that when a pressurized cleansing liquid is supplied through the hoses 54 as described in connection with FIG. 4, then the liquid will leave the tool parts as liquid jets 70, which are splashed against the shaping cavity surface of the respective opposite tool parts, i.e. the tool parts will effectively clean each other in a simple manner by a CIP (cleaning-in-place) system.

It may be desired to arrange for the tool parts to be generally heated or cooled, whether for promoting slippage of the die pressed lolly bodies or facilitating the die shaping of the lolly members. To this end the tool parts may be provided with any suitable means for enabling such a general heating or cooling thereof, e.g. as shown in FIG. 7 an internal channel system 72 connected with outer conduits 74 for a heating or cooling medium from a suitable source.

All depending of the circumstances it may be chosen to maintain the tool parts ice-cold for counteracting any bacterial growth thereon and promote slippage for some types of material, or to keep them warm or lukewarm. The said CIP cleaning system may be uitlized even during normal operation, since it may be considered advantageous to repeatingly effect a cleaning (FIG. 6) with short duration between consecutive die shaping operations, e.g. with lukewarm water of some 30°. Hereby the system is effectively maintained cleaned, and a surface temperature of ca. 30° C. of the shaping cavities will condition an easy slippage for several types of material to be die shaped.

The ice cream or other material to be die shaped should preferably be adapted or optimized to this treatment, but it is deemed unnecessary at this place to consider the details of the character of the material. An ordinary ice cream may well be used, but it will be available to produce the starting lolly members 12 (FIG. 1) with a temperature, which is somewhat higher than according to normal standard, e.g. some $-13°$ — $-16°$ C. versus $-18°$. The plasticity of the material is generally increased for an increasing contents of sugar, and other factors affecting the formability of the lolly members are the degree of swelling (air contents) of the material and the contents of various emulsifying agents as already used in ice cream production.

In the foregoing the final ice cream lollies 13 (FIG. 1) have been described as being made by die shaping of ice cream members 12 produced by a conventional freezing molding technique. In connection with the invention, however, it has been cognized that it is not necessary to start by making a conventional lolly 12, because it is later deformed or shaped anyhow, so in fact it is sufficient to feed to the respective forming tools a lump of material having the correct volume, but a substantially noncritical shape, and based on this cognition it is suggested as an alternative to supply the material simply as portions of a prefrozed, deformable mass.

An easy manner of supplying the necessary material portion to a forming tool set is illustrated in FIG. 8, in which reference numeral 80 designates a running-through freezer receiving the relevant material mixture through a pipe 82, e.g. from a unit for precooling the mixture, and forcing the frozen mass out through an outlet or extruder pipe 84, the outlet of which cooperates with a cutter valve plate 86 operable by a control cylinder 88 to open and close the said outlet. A set of forming tools 16 and 18 is placed underneath the outlet of the pipe 84, and in operation the cylinder 88 is actuated to open and reclose the pipe outlet so as to allow for a prefrozen material lump 90 of a predetermined correct volume to be delivered to the tool set. Thereafter the tool set is closed as indicated by arrows, whereby the lump 90 will be deformed into the desired final shape of the product.

If desired, the product thus produced may well be provided with a holding stick 6, which may be introduced through a top recess 92 in or between the closed tool parts 16 and 18 as shown in FIG. 9. Alternatively, as illustrated in dotted lines in FIG. 8, a stick 6 may be introduced upwardly through a recess 94 in a base plate member 96, on which the tool parts are slidingly supported. The stick may be introduced into the material after or just before the final closing phase of the tool parts.

With the simple arrangement shown in FIG. 8 the running-through freezer 80 shall have to operate in a discontinuous manner, but it would be possible to use a continuously operating freezer including a positive displacement pump as well known in the art, e.g. if the outlet pipe 84 is connected to several outlets, which are sequentially opened and closed for supplying material to several tool sets in a consecutive manner, such that there will hereby exist a steady outflow from the freezer.

In FIG. 10 it is illustrated that a film material 100 may be arranged between reels 102 and 104 so as to cover the outer opening of the shaping cavities 17 of the tool parts 16 and 18, whereby the film will be forced against the surface of the cavities when the tool set is actuated, as comparable to FIG. 5. Hereby the film will act as a slip means and a means for preventing direct contact between the tool parts and the material to be shaped. The film may be gradually displaced from the supply reel 102 to the takeup reel 104, whereby the previous contact areas between the film and the ice cream will be successively moved away from the working area as a measure of counteracting bacteriological problems.

It will even be possible to use the system of FIG. 10 for an individual packaging or enveloping of the ice cream bodies in film material, since all that is necessary is that the film or sheet material is of a weldable or otherwise joinable character and that the tool parts are provided with welding or other joining effecting means on their interfacing surfaces outside or along the edge of the shaping cavities. Thus, in FIG. 11 it is shown that the tool part 18 is provided with a welding wire 106 projecting slightly from the flat front surface of the tool part and forming a loop about the opening of the shaping cavity 17, while the opposed tool part 16 is correspondingly provided with a welding backing strip 108 e.g. of Teflon (Reg.TM). With such an arrangement the opposed sheets 100 will automatically be welded together about the final product when in the last phase of the closing of the tool set the heated welding wire 106 causes such a welding to take place. Preferably, as known per se, the welding wire may at the same time cut the welded together material, whereby the contour of the resulting envelope will or may be very close to the contour of the product itself. On the other hand, the welding wire should not necessarily be located closely along the edge of the shaping cavity.

In FIG. 10 the illustrated hatched areas 110 on the film 100 are meant to represent previous contact areas between the film and the ice cream material, but it will be understood that these areas could as well represent regular holes in the film, when the film is used for the wrapping of the ice cream bodies according to FIG. 11.

The wrapping as here discussed may be used in connection with the production according to both FIG. 1, FIG. 8 and FIG. 9, i.e. irrespectively of whether or not the ice cream body is provided with a stick 6, but if a stick is present it will project outside the wrapping.

In FIG. 12 is show that a tool part 112 may be large enough to even comprise a recess 114 for a stick 6, which is introduceable through this recess, while the welding wire 106 surrounds the contour of both the ice cream body and the stick. It does not extend across the recess 114, but at this place a piece of welding wire may be mounted on a plunger member 116 which is shiftable between a retracted position flush with the bottom surface of the recess 114, for enabling introduction of the stick 6, and an operative position with said piece of welding wire bridging the opposed ends of the welding wire 106 so as to be operable to weld the film layers together even outside the free end of the stick 6. The film 100 is shown with the holes, 118, as left by the previousle treated ice cream lollies.

A continuous production based on the principles of FIGS. 9 and 12 is illustrated schematically in FIG. 13. The tool sets comprising tool parts 112 and 113 are mounted horizontally on respective vertical base members 120, which are movable in a closed horizontal path as indicated by arrows $A_1$, $A_2$, $A_3$ and $A_4$. The tool parts 112 and 113 are vertically slidably arranged on the base members 120, by control means not shown, and by their movement along the arrow $A_1$ the tool parts assume an open position, whereby they are introduced over the two interspaced film lengths 100 so as to be brought into the position shown in full lines at the right hand side og FIG. 13. The outlet pipe 84 from the running-through freezer exists horizontally in the space between the opposed film lengths, such that a lump of ice cream material will get deposited on the lower film when the cylinder 88 is actuated to open and reclose the outlet end of the pipe 84. The lump will be loosely supported by the lower tool part 113 and will be centered thereon by its tendency to fall down into the shaping cavity of the tool part and by a corresponding depression deformation of the lowermost film 100.

Thereafter the tool set is moved along the arrow $A_2$, and the tool parts are moved together into an almost closed position, in which, as shown, a stick 6 is caused to be introduced into the ice cream body between the film layers 100 (see also FIG. 12). The sticks may be taken consecutively from a magazine (not shown) and introduced by means of a suitable pusher member 122.

Thereafter the tool parts are forced entirely together with the welding wire 106 in heated condition, and the plunger member 116 is actuated to complete the closing and separation welding about the entire stick fitted ice cream body.

Then, as shown to the left in FIG. 13, the lower tool part 113 is lowered to a position, in which the ready shaped, wrapped and cut out ice lolly unit 124 as now resting on the tool part 113 is moved free of the upper tool part and free of the two film layers 100, just leaving a hole 118 therein (FIG. 12). Therefore, the two film layers may thereafter be rolled up as one combined layer onto a single reel 104.

Figure 14:
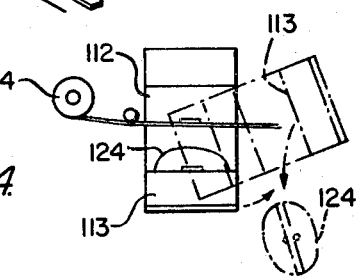

The tool set is thereafter retracted along the arrow $A_3$ to a rear position, from which it is returned to the described starting position along the arrow $A_4$. In the said retracted position or during said returning the tool set is caused to be tilted, e.g. as illustrated in FIG. 14, such that the final product 124 falls out of the shaping cavity of the tool part 113.

It should be mentioned that in connection with an ice cream supply by extrusion as in FIGS. 8 and 13 it will be preferable to cause the extrusion nozzle to be retracted corresponding to the rate of delivery of the ice cream, such that the extruded material will not carry out any axial movement relative the shaping tools.

The shaping tool parts may consist of any suitable material, but preferably they are produced as moldings of plastics, e.g. polyurethane, whereby they may be produced at low costs and even show good natural slip properties.

The spraying of water or another liquid onto the tool parts as illustrated in FIG. 6 may of course be utilized even in association with an extrusion material supply as according to FIG. 8, and moreover the spraying onto the tool parts may be effected by separate exterior nozzle means rather than by means of the channels 46. The spraying may serve three purposes, viz. to improve the slip effect, to heat the form parts, and to clean the form parts, and experiments have shown that it may be advantageous to effect a spraying with lukewarm water between each pair of consecutive die pressing operations.

The pivotal arrangement of the tool parts according to FIGS. 1 and 2 and the associated use of a knee-link actuation system 24,26 will be generally applicable, also in connection with extrusion supply systems as in FIGS. 8 and 13. The knee link control shows the advantage that a relatively weak motor such as the air cylinder 30 is usable for causing the tool parts to be moved to and from their open or outermost positions at considerable speed, while at the end of the closing movement the speed will be reduced and the pressing force increased, just as ideally desirable for the final shaping of the articles.

When the material is supplied by way of extrusion as distinguished from premolded members of the material it is of course not necessary that the extruded material portions be supplied to the receiving space between the shaping tool parts in the direct manner described in connection with FIGS. 8 and 13; the extruded material portions may be delivered to some intermediate carrier which is operable to move the extruded portions into the said receiving space between the tool parts.

It will be readily understood that the invention as defined in the appended claims is in no way limited to the detailed embodiments as here discussed, since numerous modifications will be possible within the scope of the invention.

What is claimed is:

1. An apparatus for producing ice cream lollies or similar frozen material articles of irregular shape, the apparatus comprising means for producing a prefrozen material body of regular shape, at least one pair of cooperative die tools, at least one of said die tools is provided with a generally concave shaped cavity, means for mounting said die tools so as to be pivotable between an open position and a closed together position, said die tools beind disposed at a position above said means for mounting, means for pivotably moving said tools between the open position in which a receiving space is defined between the tools, and the closed together position, means for supplying said prefrozen material body to said receiving space, whereby said frozen material body is deformable into the desired irregular shape by the tools being moved to said closed together position and thereafter retracted from each other to the open position.

2. An apparatus according to claim 1, wherein said means for supplying the prefrozen material to said receiving space includes means for producing a stick carried lolly member by molding freezing, means being provided for conveying the molded lolly member into said receiving space.

3. An apparatus according to claim 1, wherein said means for supplying the prefrozen material to said receiving space includes means for cyclically extruding a predetermined volume of said material into the receiving space in a direct or indirect manner.

4. An apparatus according to claim 1, wherein said means for pivotably moving the die tools includes a link means interposed between at least one of said die tools and at least one actuator means.

5. An apparatus according to claim 1, further comprising means for spraying a liquid onto surfaces of the cavity of the die tools.

6. An apparatus according to claim 1, further comprising means for heating surfaces of the cavity of the die tools.

7. An apparatus according to claim 1, further comprising a resilient diaphragm means arranged across an opening of the cavity of the die tools.

8. An apparatus according to claim 1, wherein said means for supplying includes a displacably mounted overhead member having a plurality of prefrozen material bodies mounted thereon, a plurality of pairs of die tools are provided and are pivotally mounted on a common mounting member, means are provided for displacing the overhead member to a position above the respective pairs of die tools, and means are provided for selectively displacing the common mounting member between a first position spaced from the prefrozen material bodies to a second position in which the prefrozen material bodies are received in the receiving spaces of the resepective pairs of die tools.

9. An apparatus according to claim 1, wherein each die tool of the at least one pair of die tools is provided with a plurality of concave shaped cavities whereby, in the open position, a plurality of receiving spaces are provided for respectively accommodating a plurality of prefrozen material bodies.

10. An apparatus according to claim 1, wherein means are provided on at least one of the die tools for enabling the supply of a compressed medium to the cavity so as to facilitate a removal of the prefrozen material body from the cavity, and means are provided for selectively controlling a flow of the compressed medium to the cavity.

11. An apparatus according to claim 1, wherein at least one of the die tools includes means for enabling at least one of a heating and cooling of the die tools to facilitate removal of the prefrozen material body from the cavity.

12. An apparatus according to claim 1, further comprising film means adapted to be located between the prefrozen material body and each of said die tools in such a manner so as to be laid against the prefrozen material body in response to the die tools being moved together.

13. An apparatus according to claim 12, further comprising means for joining opposed areas of the film means along or outside a contour of the die-shaped article and for cutting film means in an area of the joined film means.

14. An apparatus according to claim 13, wherein the means for joining enclose an area including both the cavity of the die tools and a space for receiving a handle stick projecting from the die shaped article.

* * * * *